(12) United States Patent
Gordon, Jr.

(10) Patent No.: US 7,491,280 B2
(45) Date of Patent: Feb. 17, 2009

(54) SYSTEMS AND METHODS FOR WELDING OF PARTS

(75) Inventor: Kevin Gordon, Jr., Framingham, MA (US)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 154 days.

(21) Appl. No.: 11/743,286

(22) Filed: May 2, 2007

(65) Prior Publication Data

US 2007/0199641 A1    Aug. 30, 2007

Related U.S. Application Data

(63) Continuation of application No. 10/633,177, filed on Aug. 1, 2003, now abandoned.

(30) Foreign Application Priority Data

Apr. 30, 2003  (DE) ................. 103 19 797
May 27, 2003  (DE) ................. 103 24 094

(51) Int. Cl.
    *B29C 65/08*  (2006.01)
(52) U.S. Cl. ...................... 156/64; 156/73.1
(58) Field of Classification Search ............... 700/212;
        156/73.1, 73.2, 73.3, 73.4, 73.5, 73.6, 358,
        156/359, 360, 316, 317, 378, 379, 580.1,
        156/580.2, 64
    See application file for complete search history.

(56) References Cited

U.S. PATENT DOCUMENTS

| 4,631,685 | A | 12/1986 | Peter |
| 4,818,313 | A | 4/1989 | Sundberg |
| 5,435,863 | A | 7/1995 | Frantz |
| 5,658,408 | A | 8/1997 | Frantz et al. |
| 5,855,706 | A | 1/1999 | Grewell |
| 6,979,376 | B2 | 12/2005 | Nuss |
| 2004/0178249 | A1 | 9/2004 | Gordon |

FOREIGN PATENT DOCUMENTS

| DE | 31 38 520 A1 | 1/1983 |
| DE | 34 29 776 A1 | 2/1986 |
| DE | 4131565 A1 | 3/1993 |

(Continued)

OTHER PUBLICATIONS

English Translation of DE 34 29 776 A1.

(Continued)

*Primary Examiner*—George R Koch, III
(74) *Attorney, Agent, or Firm*—Foley Hoag, LLP

(57) ABSTRACT

Systems and methods for welding of parts are described. In one embodiment, a method for ultrasonic welding of parts by means of an ultrasonic welding device including at least a generator, a converter, and a sonotrode based on a set curve of a time-dependent welding parameter appropriate to a welding connection meeting set requirements, where the welding duration corresponding to the set curve runs between a starting time $t_0$ and an end time $t_e$, wherein during welding of the parts an actual curve of the time-dependent welding parameter is measured, where in the period between $t_0$ and $t_e$ the actual curve is compared with the set curve and, depending on the existing difference, at least one process parameter affecting welding is altered such that an equalization of set curve and actual curve occurs during further welding.

14 Claims, 4 Drawing Sheets

FOREIGN PATENT DOCUMENTS

| | | |
|---|---|---|
| DE | 43 21 874 A1 | 1/1995 |
| DE | 44 29 684 A1 | 2/1996 |
| DE | 19810509 A1 | 9/1999 |
| DE | 10110048 A1 | 9/2002 |
| EP | 0 319 631 A1 | 6/1989 |
| EP | 0 421 018 B1 | 4/1991 |
| EP | 0 567 426 A2 | 10/1993 |
| EP | 0 941 774 B1 | 9/1999 |
| FR | 2427652 | 12/1979 |
| WO | WO 98/49009 | 11/1998 |
| WO | WO 02/098636 A1 | 12/2002 |

OTHER PUBLICATIONS

English Translation of DE 31 38 520 A1.
English Translation of DE 44 29 684 A1.
Kunststoffe, Carl Hanser Verlag; Ultraschallschweiβmaschine mit Programmspeicher, München, DE Apr. 1, 1989 p. 314.
Picchio, Gualtiero, "Machinery: New Developments in Ultrasound Welding," Interplastics, 14 (1991), Jul./Aug., No. 4, Milan, Italy, pp. 84-86.
Picchio, Guarltiero; Novita Nella Saldatura A Ultrasuoni, Interplastics, Technique Nuove, Milan, IT, Bd. 14, No. 4, Jul. 1, 1991, pp. 84-86.
Potente, Helmut, et al.; "Prozessoptimierung Und Online-Prozessuberwachung Beim Ultraschallschweissen"; May 1, 1994, pp. 68, 70, 73-74, 76, 78, and 80.

SYSTEMS AND METHODS FOR WELDING OF PARTS

CROSS-REFERENCE TO RELATED APPLICATIONS

This application is a continuation of U.S. patent application Ser. No. 10/633,177, filed Aug. 1, 2003, now abandoned, hereby incorporated herein by reference, which claims priority to German Patent Applications DE 103 19 797.4 and DE 103 24 094.2 filed on Apr. 30, 2003 and May 27, 2003, respectively.

BACKGROUND

German Patent Application DE 198 10 509 describes welding of dissimilar materials without prior tests. In DE 198 10 509, ultrasonic waves can be coupled into a welding material and recorded as a measurement signal based on interactions with a joining layer. The measurement signal can be stored in a measurement data memory. Subsequently, an evaluation unit can use the measurement signal to determine characteristic quantities for a welding process.

German Patent Application DE 43 21 874 A1 describes control and regulation of process parameters during ultrasonic welding of plastic parts. In DE 43 21 874 A1, the joining force can be measured during welding to monitor the energy applied to the joining point between the parts being welded.

European Patent Application EP 0 567 426 B1 describes a method for welding of plastic parts in which an oscillation amplitude of a sonotrode that is welding plastic parts can be reduced after a pre-determined time. As such, the sonotrode can work at a reduced oscillation amplitude during a remaining welding time. A control signal for reducing the oscillation amplitude can be triggered directly or indirectly based on the power transmitted to the parts being welded, as described, for example, in International Patent Application Publication WO 98/49009 and U.S. Pat. Nos. 5,435,863, 5,658,408, and 5,855,706.

International Patent Application Publication WO 02/098636 describes a method for welding of plastic parts in which an oscillation amplitude of a sonotrode can be reduced based on a pre-determined course for optimization of welding. Subsequently, a characteristic parameter of a part being welded can be measured, and the sonotrode can complete the welding process based on the value of the measured parameter with a constant oscillation amplitude.

German Patent Application DE 101 10 048 A1 describes checking connections made by ultrasonic wire bonding. In DE 101 10 048 A1, connections can be monitored on-line based on pre-determined stored master values and, based on monitoring the connections, conclusions can be drawn about the strength of the connections.

SUMMARY

Systems and methods for welding of parts are described herein.

In one embodiment, a method for welding of parts can include generating a measured or actual curve of a time-dependent welding parameter during welding, comparing the actual curve with a set curve during the period between $t_0$ (the starting time of the set curve) and $t_e$ (the ending time of the set curve), and, based on a difference between the actual curve and the set curve, altering one or more welding process parameters such that the actual curve approaches the set curve during further welding.

In one aspect, the set curve and the actual curve can be compared at least at a time $t_1$, in which $t_0 < t_1 < t_e$.

In one aspect, the set curve and the actual curve can be compared at identical welding parameter values (e.g. power values) and/or identical areas underneath the curves (e.g. energy values). For example, the set curve and the actual curve can be compared based on an energy input, which can be represented by the integral of a power vs. time curve.

In one aspect, changes to one or more welding process parameters can be based on comparisons made at one or more times (for example, times $t_1, t_2, \ldots, t_n$, with $n \geq 2$) between the set curve and actual curve.

In one aspect, the welding process parameters can be gradually altered over time.

In one aspect, the welding process parameters can be regulated based on the differences between the set curve and actual curve.

In one aspect, the welding process parameters can be altered based on stored values associated with the set curve (e.g. from tables of values associated with the set curve) and/or based on mathematical functions (e.g. extrapolations and/or interpolations based on the tables of values).

The disclosed methods can be used in ultrasonic welding of parts. For example, the methods can be used with an ultrasonic welding device that includes a generator, a converter, and a sonotrode.

In one aspect, the time-dependent welding parameter can include the emitted and/or the received power of an ultrasonic welding device.

In one aspect, the welding process parameters can include one or more of an oscillation amplitude of a sonotrode, a pressure acting on the parts being welded, a force acting on the parts being welded, an energy input from a sonotrode, and an oscillation frequency of a sonotrode.

These and other features of the systems and methods described herein can be more fully understood by referring to the following detailed description and accompanying drawings.

DETAILED DESCRIPTION

Figure 1:
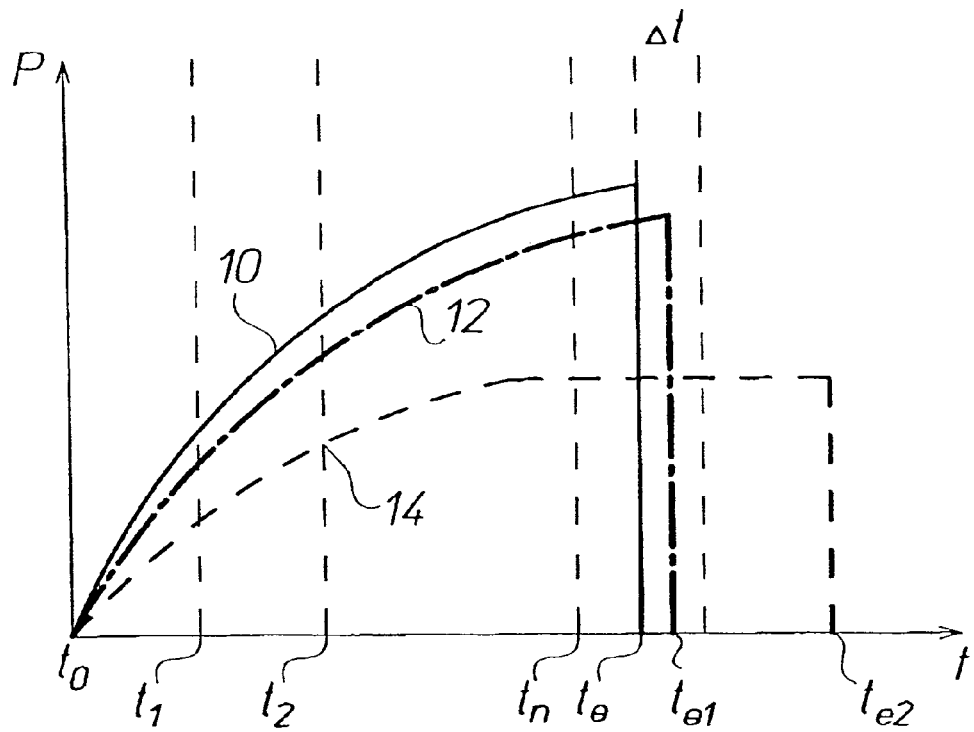
FIG. 1 shows power vs. time curves for one system for welding conductors.

Illustrative embodiments will now be described to provide an overall understanding of the systems and methods described herein. One or more examples of the illustrative embodiments are shown in the drawings. Those of ordinary skill in the art will understand that the systems and methods described herein can be adapted and modified to provide devices, methods, schemes, and systems for other applications, and that other additions and modifications can be made to the systems and methods described herein without departing from the scope of the present disclosure. For example, aspects, components, features, and/or modules of the illustrative embodiments can be combined, separated, interchanged, and/or rearranged to generate other embodiments. Such modifications and variations are intended to be included within the scope of the present disclosure.

In one method of welding conductors, values of welding parameters for previous empirically-determined "good" welds of conductors (i.e. satisfactory welds of conductors)

can be stored and associated with the total cross-sections of the conductors that were welded. The welding parameters can include one or more of pressure, amplitude, frequency, tool size, energy, welding time, and other parameters known to those of ordinary skill in the art. Subsequently, a weld of conductors having a given total cross-section can be performed based on the stored parameters associated with the given total cross-section. For example, during welding, a welding parameter (e.g. a power) can be compared to a corresponding stored parameter. If the value of the welding parameter is substantially similar and/or identical to the corresponding stored value of the parameter, a time window $\Delta t$ following the stored welding end time $t_e$ can be determined. The time window $\Delta t$ can be based on the time $t_e-t_0$, where $t_e$ is the stored welding end time and $t_0$ is the stored welding start time. The time window $\Delta t$ can range from about 10% to about 20% of the time difference $t_e-t_0$. A weld can be classified as a "good" weld if a weld of conductors can be completed between $t_e$ and $t_e+\Delta t$. A weld can be classified as an "insufficient" weld if the weld of conductors cannot be completed until after $t_e+\Delta t$.

In one example of the previously described method, a power vs. time curve for a good weld can be empirically determined, in which the area underneath the curve can represent the energy input associated with a weld of conductors having a total cross-section. A subsequent welding of parts having the same total cross-section can be classified as "good" if the end time of welding occurs within the power vs. time curve or in a subsequent time window thereafter.

FIG. 1 shows power vs. time curves for the previously described method. In FIG. 1, the power vs. time curve labelled 10 can correspond to a set curve associated with a satisfactory weld of conductors. The area underneath the set curve 10 can represent the energy input E, in which $$E = \int_{t=0}^{t=te} P dt,$$

where P represents power and t represents time. Other conductors having the same total cross-section as the conductors used to generate the set curve 10 can be welded using an energy input that is identical to that for the set curve 10 (i.e. identical to the value E, as previously provided). In FIG. 1, the power vs. time curves labelled 12 (dash-dotted curve) and 14 (dashed curve) can represent subsequent welds of conductors, in which the areas underneath the curves (i.e. the energy inputs) are identical to that of the set curve 10 (i.e. identical to the value E, as previously provided). As shown in FIG. 1, the subsequent welds can be completed at different times, such as the times $t_{e1}$ and $t_{e2}$. Based on previously collected empirical data (e.g. the empirical data used to generate the set curve 10), welds in which the end of welding occurs before $t_e$ of set curve 10 or within a subsequent time window $\Delta t$ after $t_e$ can be deemed good. In the present example, therefore, the weld represented by the curve 12 can be deemed good, since welding for curve 12 was completed at the time $t_{e1}$, which time occurs within the time window $\Delta t$ of the time $t_e$. In contrast, the weld represented by the curve 14 can be rejected, because welding for curve 14 was completed at the time $t_{e2}$, which time occurs later than the time $t_e+\Delta t$. As previously described, the time window $\Delta t$ can range from about 10% to about 20% of the duration of welding (i.e. the time difference $t_e-t_0$) associated with the set curve 10.

As will be understood by those of ordinary skill in the art, different materials, different placements of conductors in a welding tool (e.g. different placements of conductors between a sonotrode and an anvil), and/or fluctuations in temperature and/or environmental conditions can adversely affect welds. For example, one or more of these factors can cause a weld having the same total cross-section as a pre-determined weld to not be completed within a subsequent time window of the welding end time of a pre-determined power vs. time curve.

Potentially advantageously, the disclosed systems and methods can regulate welding processes to compensate for one or more of these factors.

FIGS. 2-5 shows power vs. time curves for an exemplary system for welding of conductors, in which set curves are labelled with reference numeral 10. Generally, as further described herein, comparisons can be made between welds having total cross-sections that are substantially identical to the cross-section of the weld used to generate the set curve 10. In embodiments, the comparisons can be made at one or more times, at one or more constant power values (i.e. when the set curve and an actual curve have the same power value), and/or at one or more constant energy input values (i.e. when the set curve and an actual curve have the same integrated area).

Figure 2:
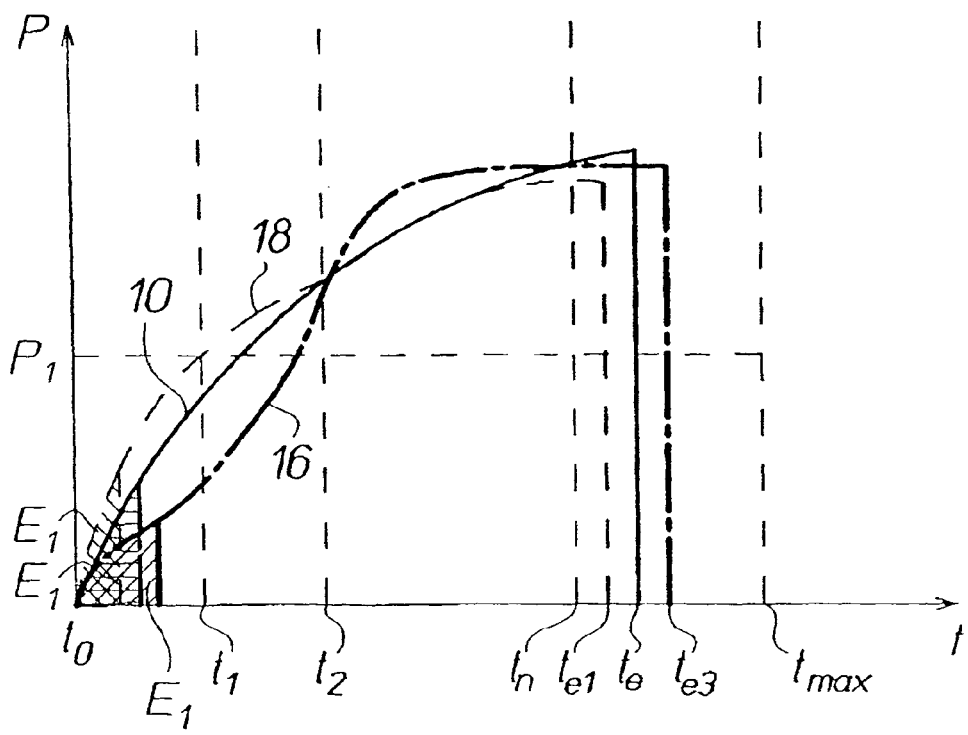
FIGS. 2-5 show power vs. time curves for an exemplary system for welding conductors.

As shown in FIG. 2, in one embodiment, a comparison can be made at a time, e.g. time $t_1$, between the set curve 10 and one or more actual curves ascertained during welding, such as actual curves 16 (dash-dotted) and 18 (dashed). As shown, at time $t_1$, the actual curve 16 can have a power value that is less than the power value of the set curve 10. Based on the power values of the actual curve 16 and the set curve 10 at time $t_1$, one or more welding process parameters in the weld represented by the actual curve 16 can be changed so that the actual curve 16 can approach the set curve 10. For example, a welding process parameter such as the amplitude of a sonotrode and/or a force exerted by the sonotrode on the parts being welded can be changed (e.g. increased or decreased). In some embodiments, one or more welding process parameters can be increased based on an actual curve having a power value that is less than a power value of a set curve at a given time, while one or more welding process parameters can be decreased based on an actual curve having a power value that is greater than a power value of a set curve at a given time.

As shown in FIG. 2, in one embodiment, a comparison can be made at a second time that is later than a first time, e.g. at a time $t_2$ that is later than the time $t_1$. Based on changing one or more welding process parameters at time $t_1$, the actual curve 16 can approach the set curve 10, i.e. the former can comes closer to the latter at times t later than $t_1$. As shown in FIG. 2, the actual curve 16 can have a power value that is greater than the power value of the set curve 10 at time $t_2$. As previously described, in some embodiments, one or more welding process parameters can be changed based on this difference between the actual curve 16 and the set curve 10. For example, in some embodiments, the amplitude and/or the force associated with a sonotrode can be changed (e.g. reduced). Alternatively and/or in combination, the total energy input can be changed. In embodiments, regulation of welding can be performed at various frequencies of an ultrasonic welding device, for example, at frequencies including one or more of 20 kHz, 35 kHz, 40 kHz, etc.

As shown in FIG. 2, the welding represented by the actual curve 16 can be completed at a time $t_{e3}$ which can be later than the end time $t_e$ of the set curve 10. Generally, for the disclosed systems and methods, a good weld can be formed regardless of whether the welding end time (e.g. $t_{e3}$) occurs with a pre-determined time window $\Delta t$ of the ending time $t_e$ of the set curve 10. As used herein, a "good" weld can include a satisfactory weld as that term is understood by those of ordinary skill in the art. For the disclosed systems and methods, the welding end time of a good weld can be greater than or less than $t_e$. As will be understood by those of ordinary skill in the art, an upper limit on the welding end time can be chosen to inhibit continued regulation of welding. For example, as shown in FIG. 2, the upper limit of welding end time can be denoted as time $t_{max}$. In one embodiments, welds having welding end times greater than time $t_{max}$ can be rejected.

FIG. 2 shows a second actual curve 18 (dashed curve). As shown in FIG. 2, the actual curve 18 can run above the set curve 10 at time $t_1$. As previously described herein, one or more welding process parameters can be changed (e.g. reduced) in order to approximate the actual curve 18 to the set curve 10. As also shown in FIG. 2, the actual curve 18 can match the set curve 10 at time $t_2$. Based on the value of the welding process parameter previously stored and/or changed based of the difference between the set curve 10 and the actual curve 18 at time $t_1$, the welding operation represented by the actual curve 18 can be completed at a time $t_{e1}$ that is earlier than the time $t_e$ of the set curve 10.

Generally, comparisons between a set curve, such as set curve 10, and one or more actual curves, such as actual curves 16 and 18, can be made at one or more times $t_n$, and/or at one or more constant power values, and/or at one or more constant energy inputs. These comparisons are shown in FIG. 2. For example, the actual curves 16, 18 and the set curve 10 can be compared at constant times $t_1$, and/or constant areas $E_1$, and/or constant power values $P_1$. As described herein, one or more welding process parameters of a welding operation represented by an actual curve 16, 18 can be changed based on one or more of the comparisons shown in FIG. 2. For example, based on a comparison between the set curve 10 and actual curves 16, 18 at constant power value $P_1$, the welding operations represented by the actual curves 16, 18 can be changed, e.g. one or more welding process parameters can be increased (for curve 16, for example) or decreased (for curve 18, for example). Also for example, based on a comparison between the set curve 10 and actual curves 16, 18 at constant energy input $E_1$, the welding operation represented by the actual curve 16 can be changed to so that one or more welding process parameters can be increased, and the welding operation represented by the actual curve 18 can be changed so that one or more welding process parameters can be decreased.

Figure 3:
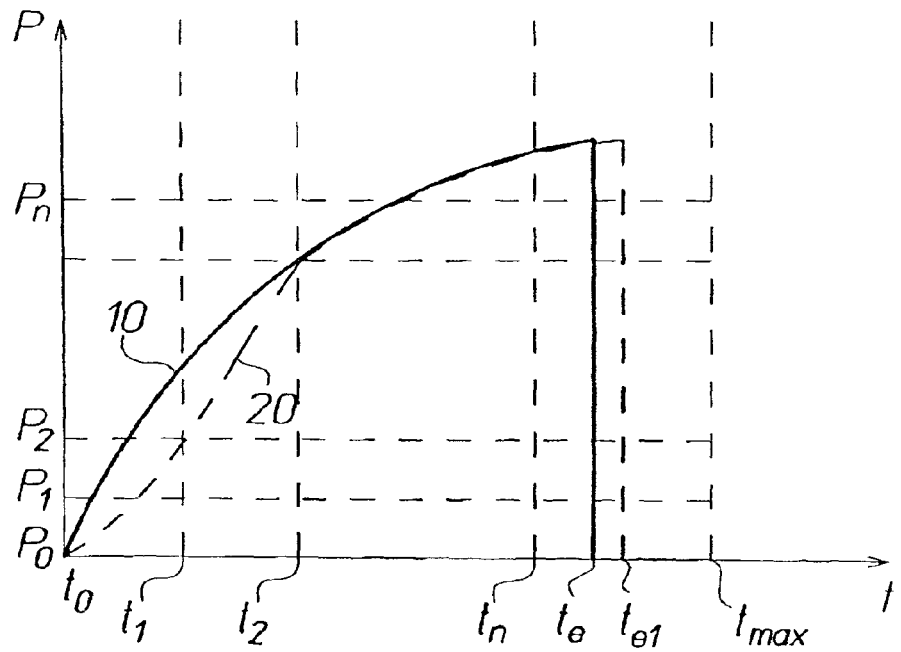
Figure 4:
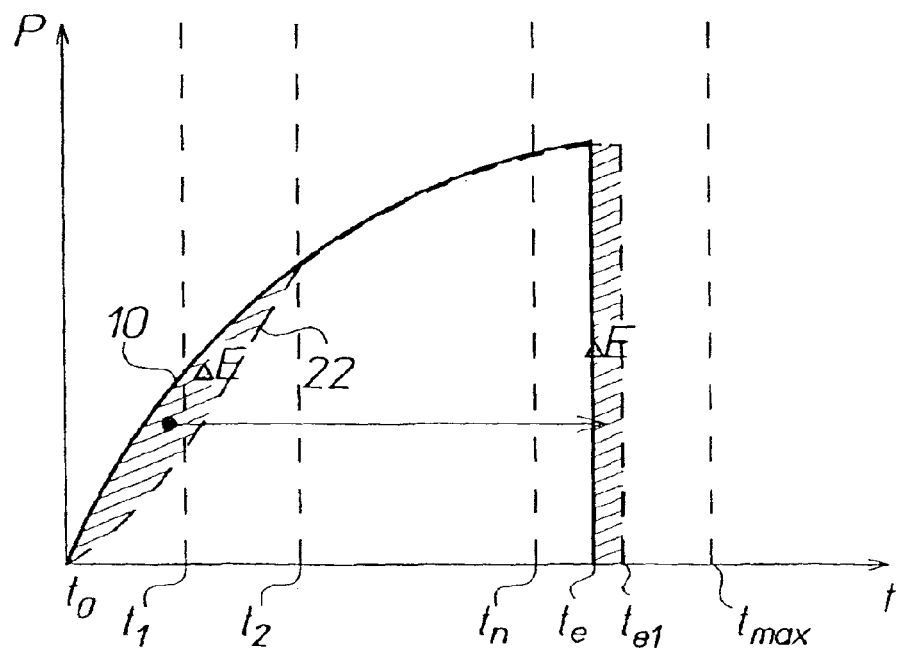
Figure 5:
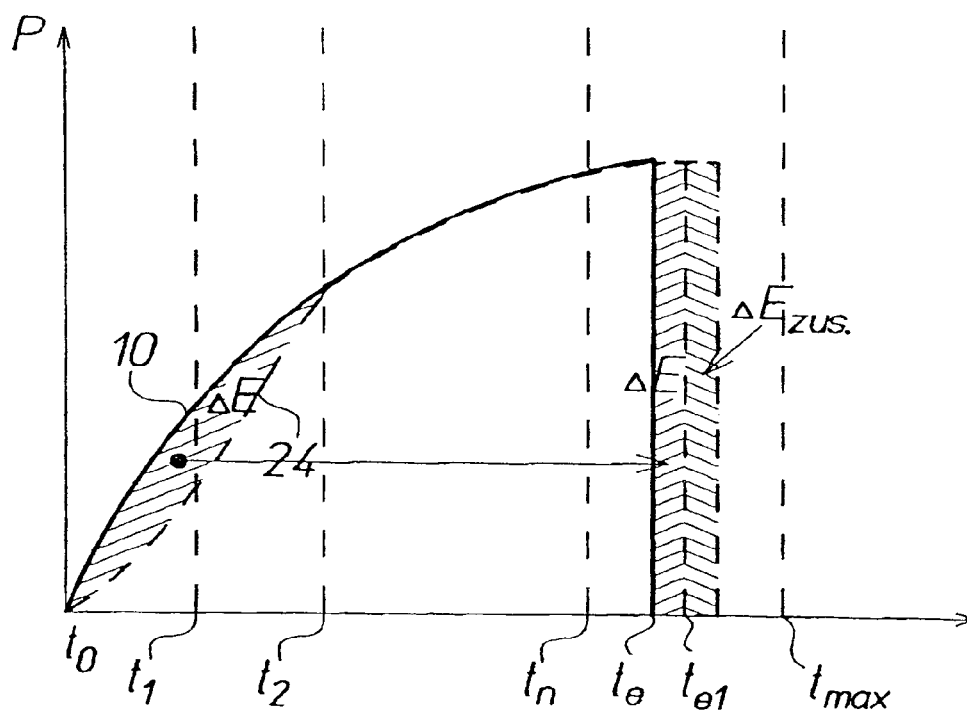

FIGS. 3 to 5 show other power vs. time curves for an exemplary system for welding of parts as described herein, in which the set curves are labelled with reference numeral 10.

As previously described herein with reference to FIG. 2, a welding operation using an ultrasonic welding device can be regulated based on comparisons between a set curve 10 and an actual curve 20 at one or more power values $P_1 \ldots P_n$. Changes in welding process parameters can be triggered based on differences between the set curve 10 and the actual curve 20 at different power values $P_1 \ldots P_n$. For example, as shown in FIG. 3, based on comparing the set curve 10 and the actual curve 20 at a power value $P_2$, one or more welding process parameters can be changed (e.g. increased) in order to drive actual curve 20 to set curve 10. Regardless of this change, the total energy inputs for the welding operation to be regulated (i.e. the welding operation represented by the actual curve 20) and the process upon which the set curve 10 is based can be kept identical. As shown in FIG. 3, the end time $t_{e1}$ at which the welding operation represented by the actual curve 20 is completed is between $t_1$ and $t_{max}$.

As shown in FIG. 4, a regulation between the set curve 10 and an actual curve 22 can be performed based on an energy input. For example, as shown in FIG. 4, if the actual curve 22 and the set curve 10 diverge with reference to the energy input E at the respective measurement times $t_1, t_2, \ldots, t_n$, in which $$E = \int_{t=0}^{t=t1\ldots tn} P dt$$

then one or more welding process parameters can be changed based on the systems and methods described herein. Regardless of this change, the welding operation represented by the actual curve 22 can be completed when the energy input of actual curve 22 is identical to that of set curve 10.

As previously described, one or more welding process parameters, such as a pressure and/or an amplitude of an ultrasonic welding device, can be changed based on the schemes described herein. Alternatively and/or in combination, an energy input can be changed (e.g. increased). For example, as shown in FIG. 5, when the integral of actual curve 24 is identical to that of the set curve 10, a further energy input $\Delta E_{zus}$ can be made before the welding operation is completed at time $t_x$. As previously described, comparisons between the actual curve 24 and the set curve 10 can be made at different times $t_1 \ldots t_n$.

Figure 6:
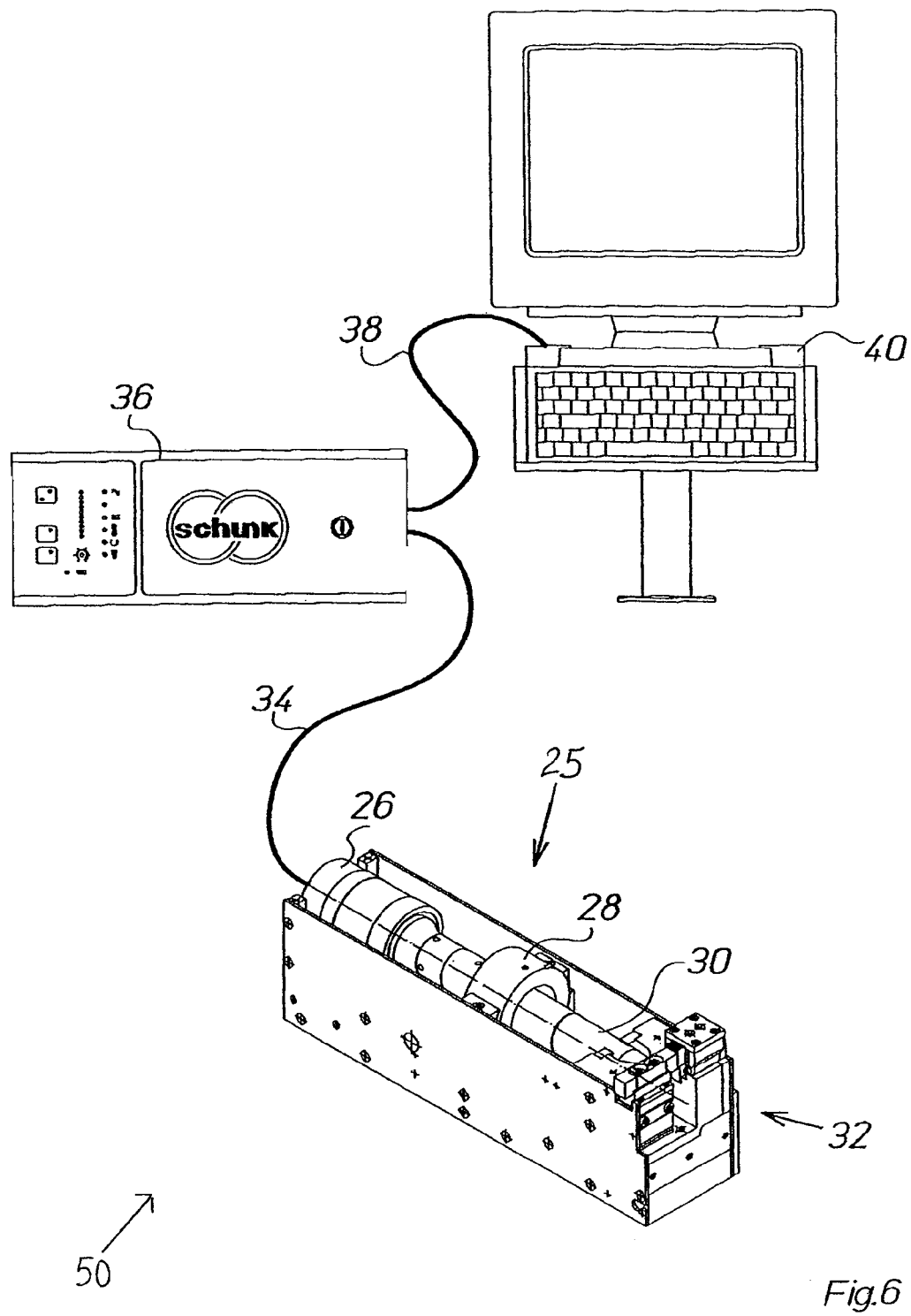
FIG. 6 shows an exemplary system for welding conductors.

FIG. 6 shows an exemplary system for welding of parts, such as electrical conductors. As shown in FIG. 6, in one embodiment, a system 50 for welding parts as described herein can include an ultrasonic welding device 25 having a converter 26 and a sonotrode 30. As shown in FIG. 6, in some embodiments, the system for welding parts can include a booster 28. The sonotrode 30 (i.e. the entire sonotrode 30 or a portion of the sonotrode 30) can be associated with a counter electrode 32 serving as an anvil. The counter electrode 32 can include one or more parts and can be constructed based on schemes similar to those described in U.S. Pat. Nos. 4,596,352 and 4,869,419. The counter electrode 32 can provide a compression area of adjustable cross-section inside of which parts to welded can be placed. The parts to be welded can include metallic parts (e.g. conductors) and/or non-metallic parts (e.g. plastic parts). The converter 26 can be connected via a lead 34 to a generator 36, and the generator 36 can be connected via a lead 38 to a digital data processing device 40 (e.g. a personal computer (PC)). The digital data processing device 40 can control the ultrasonic welding device 25 and/or the generator 36 based on the schemes previously described herein. For example, the digital data processing device 40 can provide the welding process parameters and/or or the cross-section of conductors to be welded to the ultrasonic welding device 25 and/or the generator 36. The digital data processing device 40 can be configured to determine the power emission of the generator 36, generate and/or otherwise be provided with a set curve and an actual curve of a welding process, compare the actual curve with the set curve, and alter one or more welding process parameters based on a difference between the actual curve and the set curve. The digital data processing device 40 can include one or more software programs configured to perform one or more of these functions when executed on the digital data processing device 40.

While the systems and methods described herein have been shown and described with reference to the shown embodiments, those of ordinary skill in the art will recognize or be able to ascertain many equivalents to the embodiments described herein by using no more than routine experimentation. Such equivalents are intended to be encompassed by the scope of the present disclosure and the appended claims.

For example, the systems and methods described herein can be used to weld metallic parts (e.g. conductors) and non-metallic parts (e.g. plastic parts) and are not limited to welding of electrical conductors.

Also for example, one or more welding process parameters can be changed based on the schemes described herein. The one or more welding process parameters can be altered sequentially and/or concurrently.

Also for example, the power curves described herein can be ascertained based on the power emitted by a generator and/or the power input of a sonotrode or oscillator over time based on schemes known by those of ordinary skill in the art Accordingly, the appended claims are not to be limited to the embodiments described herein, can comprise practices other than those described, and are to be interpreted as broadly as allowed under prevailing law.

I claim:

1. A method for ultrasonic welding of parts by means of an ultrasonic welding device comprising at least a generator, a converter, and a sonotrode, based on a set curve of a time-dependent welding parameter appropriate to a welding connection meeting set requirements, where the welding duration corresponding to the set curve runs between a starting time $t_0$ and an end time $t_e$, and
   a) during the welding of the parts an actual curve of the time-dependent parameter is measured,
   b) in the period between $t_0$ and $t_e$ the actual curve is compared with the set curve, and
   c) at least one welding process parameter affecting welding is altered to a value chosen based on a difference between the set curve and the actual curve at a time of comparison, in order that the difference is reduced during welding after the time of comparison and the actual curve converges toward the set curve, and
wherein the at least one welding process parameter to be altered consists of one or more of: an amplitude of the sonotrode, a frequency of the sonotrode, a pressure acting on the parts to be welded, a force acting on the parts to be welded, and an energy input into the parts to be welded.

2. The method of claim 1, wherein the set curve is compared with the actual curve at a time $t_1$, where $t_0 < t_1 < t_e$.

3. The method of claim 1, wherein the actual curve is compared with the set curve at an identical power value.

4. The method of claim 1, wherein the actual curve is compared with the set curve at an identical energy input measured from the beginning of welding.

5. The method of claim 1, further comprising:
   based on a difference between the actual curve and the set curve, altering at least one process parameter of correspondingly stored values.

6. The method of claim 1, wherein at least one welding process parameter is altered gradually over time.

7. The method of claim 1, wherein the actual curve is matched to the set curve by a regulation process.

8. The method of claim 1, wherein the at least one welding process parameter is altered based on comparisons made at various times $t_1, t_2 \ldots t_n$ where $n \geq 2$ between the set values and actual values.

9. The method of claim 8, wherein a regulation of the at least one welding process parameter based on differences between the set curve and actual curve is performed at the times $t_1, t_2 \ldots t_n$ where $n \geq 2$.

10. The method of claim 1, wherein the emitted/received power of the ultrasonic welding device is selected as the time-dependent welding parameter.

11. The method of claim 1, wherein one or more welding process parameters are altered singly.

12. The method of claim 1, wherein one or more welding process parameters are altered jointly.

13. The method of claim 1, wherein welding is regulated over its full duration based on the respective current difference between set curve and actual curve.

14. The method of claim 1, wherein welding is regulated over at least part of its duration based on the respective current difference between set curve and actual curve.

* * * * *